Figure 1:
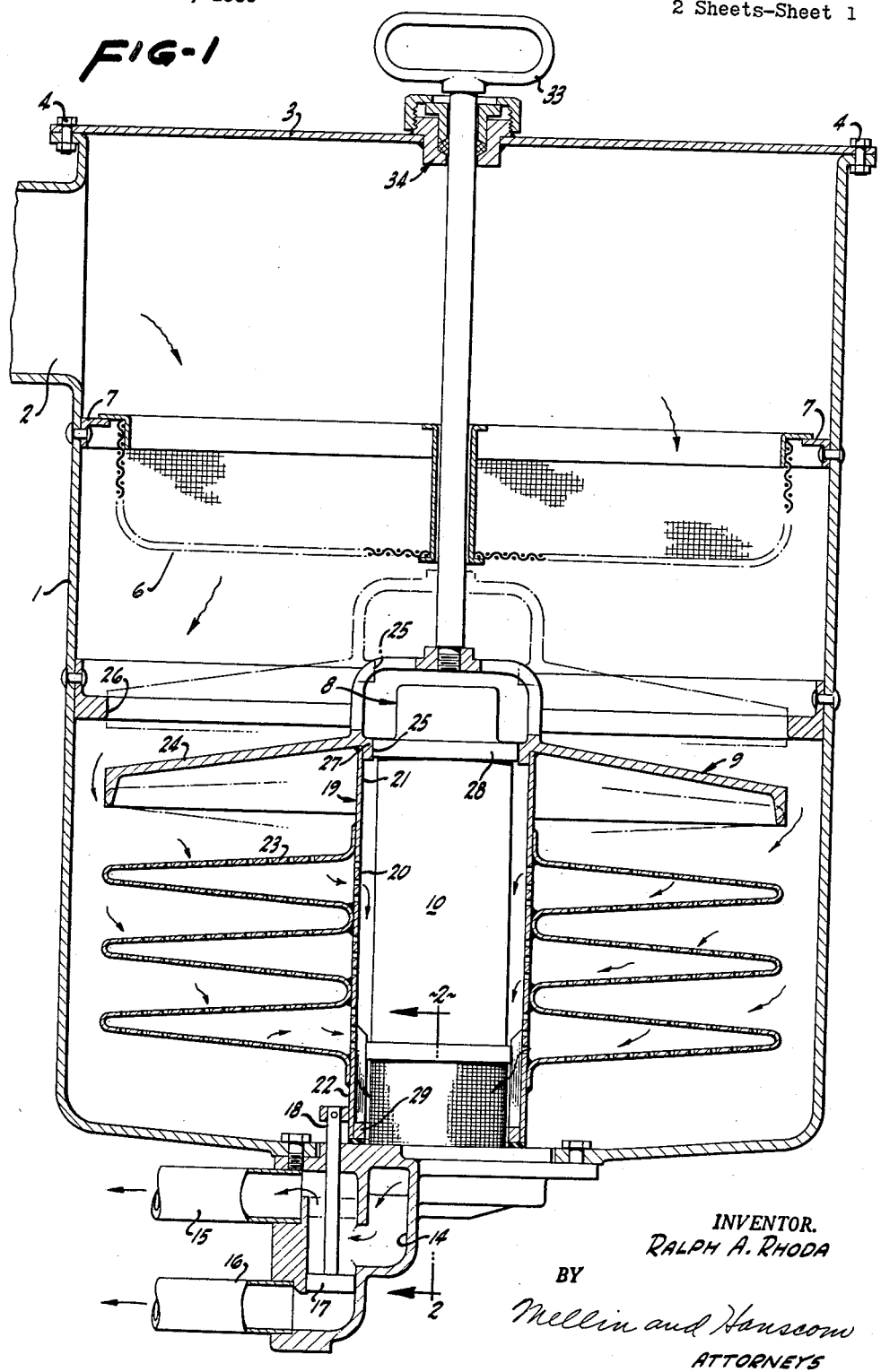

Feb. 2, 1965

R. A. RHODA 3,168,470

SUBMERSIBLE MOTOR-PUMP AND FILTER STRUCTURE SYSTEM

Filed Jan. 19, 1959

2 Sheets-Sheet 1

INVENTOR.
RALPH A. RHODA
BY
Mellin and Hanscom
ATTORNEYS

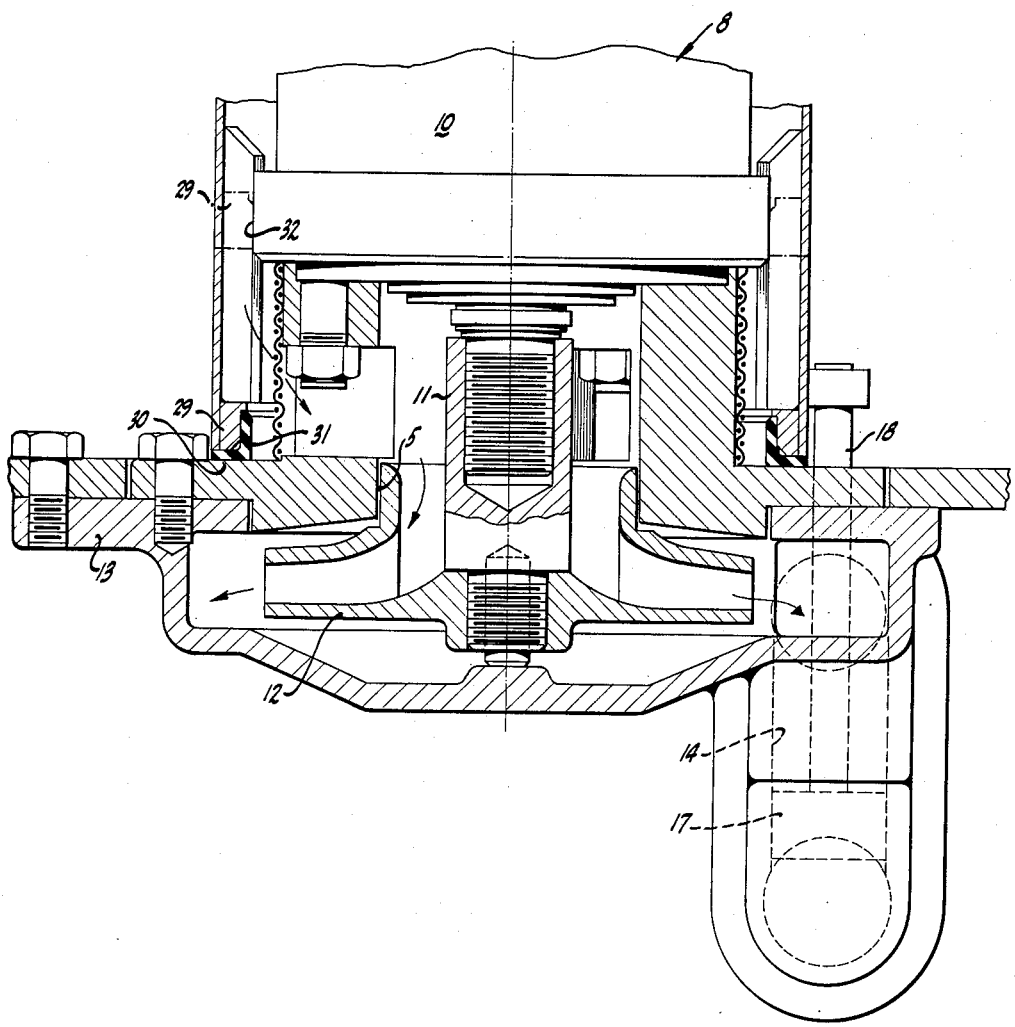

United States Patent Office 3,168,470
Patented Feb. 2, 1965

3,168,470
SUBMERSIBLE MOTOR-PUMP AND FILTER
STRUCTURE SYSTEM
Ralph A. Rhoda, Berkeley, Calif., assignor to Berkeley
Pump Company, Berkeley, Calif., a corporation of
California
Filed Jan. 19, 1959, Ser. No. 787,575
12 Claims. (Cl. 210—239)

This invention is related to apparatus for filtering fluids having waste matter therein, and more particularly involves a novel filter structure which has particular utility in recycling water from a swimming pool.

It is one object of this invention to provide a compact filter structure having a submersible motor-pump and filter elements disposed in a filter housing.

A second object is to provide a filter structure including a housing and filtering elements with cooperating relationships permitting the filtering elements to be selectively backwashed, whereby the filtered fluid and backwash fluid is discharged through the same outlet.

Other objects of this invention will be apparent from a study of the following description and in view of the accompanying drawings.

In the drawings, forming a part of this application, and in which like parts are designated by like reference numerals throughout the same, FIG. 1 is a vertical section of the apparatus which forms the subject matter of this invention.

FIG. 2 is an enlarged section of a portion of the apparatus of FIG. 1 showing details of the motor-pump mounting, taken on lines 2—2.

Referring to FIG. 1 of the drawings, there is shown one embodiment of this invention comprising a substantially upright cylindrical filter housing 1 provided with a fluid inlet 2 and a removable cover assembly 3, held in place by through bolts 4. The cover assembly may be quickly removed, thereby providing ready access to the housed apparatus in case of a malfunction or the need of performing periodic maintenance. A fluid outlet 5 is concentrically formed in the bottom of the housing for withdrawing fluids therefrom.

Leaf basket 6 may be provided as shown to catch the coarser of materials, such as leaves, which may be admitted through the inlet. Such baskets are conventionally employed for swimming pool filters and the use of such a basket, by itself, is not a part of this invention. The basket is supported from side brackets 7 which may be bolted to the inner surface of the housing directly below the inlet. Since all fluid must pass through the basket, it will thereby be screened of its coarse material. Periodically, the cover assembly is removed and the basket is emptied of its accumulation.

Beneath the leaf basket is a submersible motor-pump assembly, generally indicated by reference numeral 8, and a skim filter assembly 9. The motor-pump assembly is rigidly mounted in the filter housing while the skim filter assembly is free to move with limited axial movement between first and second positions. The position shown in solid lines, FIG. 1, is the normal filtering position and the broken lines indicate a position occupied for backwashing the filter assembly.

Motor-pump assembly 8 is comprised of an electric motor having a cylindrical fluid-tight housing 10 with an exposed rotating shaft 11, as shown in FIG. 2. The motor housing is supported coaxially in the filter housing directly above the outlet 5. A rotating pump member 12 connects to shaft 11, and being exposed to circumambient fluids adjacent the outlet, such fluids are centrifugally swirled and discharged therethrough. The rotating pump member and motor are conveniently formed as a unitary assembly which is supported on a cover plate 13 which bolts onto the housing, closing off the outlet. Cover plate 13 opens into a two-way valve chamber 14 having conduit leads 15 and 16 fluidly connecting therewith. A valve element 17 is disposed in the valve chamber with an operating lever 18 projecting from the chamber into the filter housing. By moving lever 18 up or down, the valve element is moved to open one conduit lead and close the other, thereby selectively directing fluid from the outlet 5 into one or the other conduits.

Filter assembly 9 includes a cylindrical filter tube 19 having a sieve-like portion 20 centrally of two end portions 21 and 22. A plurality of disk-like baffle filter elements 23 are axially aligned and coaxially mounted about portion 20, substantially as shown. Filter tube 19 with its baffle elements 23 is coaxially disposed within the cylindrical filter housing 1 and circumvallates the motor-pump assembly a spaced radial distance from the motor housing 10, thereby defining a first fluid passage with the motor housing and a second fluid passage with the filter housing. A circular filter cover plate 24 surmounts the baffle members, and all fluid flowing from the inlet to the outlet will normally pass around its peripheral edge. However, an opening 25 is provided in the top of the cover plate which otherwise encloses the top of the motor housing, and, in the alternate position shown by the broken lines, fluid is allowed to pass from the inlet through opening 25 and between the filter tube and motor housing.

Valve means are provided at both ends of each passage whereby fluid may be selectively directed from the inlet into either the first or the second passage, then through said filter tube into the other passage, and, finally, discharged into the outlet. More specifically, the valve means comprises an arrangement of complementary valve surfaces which are provided on the filter assembly, motor housing, and filter housing in areas adjacent the ends of each passage.

The peripheral edge of cover plate 24 cooperates with a circular valve surface 26 which may be bolted to the inner cylindrical surface of the filter housing. When the valve assembly is in its lowermost position, these surfaces are separated and permit fluid flow around the edge of the cover plate. At this time no fluid can pass between the motor housing and filter since a circular valve surface 27 on the tube cooperates with a surface 28 on the motor housing to prevent fluid passage therebetween.

The lower end portion of filter tube 19 is provided with a sealing ring 29 which circumscribes the outlet and seats upon a bottom outlet plate 30, thereby preventing a flow around the end of the tube while it is in the lowermost position. If the filter assembly is raised to its second position, the cylindrical wall surface 31 of the ring 29 will engage a cooperating valve surface 32 on the motor housing, the position of the sealing ring 29 being suggested by the broken lines of FIG. 2.

Accordingly, when the valve assembly is in its lowermost position, fluid from the inlet is directed around the peripheral edge of cover plate 24; and since the end of the passage is closed by the sealing ring 29, the fluid is forced through the baffle filter elements 23 and tube 19 and, thence, down the first passage to the outlet. If the valve assembly is moved to its raised position, fluid is directed through opening 25 into the first passage. However, since surface 31 is now in abutment with surface 32, the fluid is conversely directed through the filter assembly and around the end of filter tube 19.

In order to operate the filter assembly between its lowermost and raised positions, a handle member 33 is threadedly connected to the filter cover 24. Handle member 33 extends upwardly through a hole provided in the leaf basket and projects outwardly from the filter housing through a fluid-tight seal, generally indicated by reference numeral 34. In connection therewith, means may be provided for holding the handle and filter assembly in its raised position. For example, a transverse pin could be provided in the handle shaft with a cooperating slotted boss member rigidly supported and coaxial with the shaft. By lifting the pin out of its slot and rotating the handle 90°, the pin and handle would be supported on the uppermost surface of the boss member.

Operating lever 18, above described, is connected to the lower end portion of filter tube 19 to permit simultaneous operation of valve element 17 as the filter assembly 9 is moved between its first and second positions. Accordingly, if the filter assembly is raised, thereby reversing the flow through the filter, the valve element 17 redirects the flow into a waste conduit.

It is to be understood that the embodiment of the invention herewith shown and described is to be taken only as a preferred example thereof; that various changes in the shape, size and arrangement of parts may be resorted to, without departing from the spirit of the invention, or the scope of the attached claims.

Having thus described my invention, what I claim and desire to secure by Letters Patent is:

1. A submersible motor, pump and filter structure comprising a filter housing having a fluid inlet and a fluid outlet; a submersible motor-pump assembly having a rotating pump member connected thereto and disposed within said housing, said pump member being exposed to circumambient fluid adjacent said outlet for discharging fluid therethrough; a filter member disposed within said filter housing and defining a first fluid passage with said assembly and a second fluid passage with said filter housing, said first and second passages extending between said fluid inlet and said fluid outlet; and valve means at both ends of each passage, whereby fluid may be selectively directed from the inlet into either said first or second passage, passed through said filter tube into said other passage, then discharged into said outlet.

2. A submersible motor, pump and filter structure comprising a filter housing having a fluid inlet and a fluid outlet; a submersible motor-pump assembly having a rotating pump member connected thereto and disposed within said housing, said pump member being exposed to circumambient fluid adjacent said outlet for discharging fluid therethrough; a filter member disposed within said filter housing and defining a first fluid passage with said assembly and a second fluid passage with said filter housing, said first and second passages extending between said fluid inlet and said fluid outlet; means including valve surfaces at both ends of each passage, said valve surfaces being complementary to movable valve surfaces which are operative between open and closed phases, the movable valve surfaces in each passage being out of phase with the other and also out of phase with the movable valve surface at the same end in the other passage, and means for operating the movable valve surfaces simultaneously to their respective opposite phase, whereby fluid may be selectively directed from the inlet into either said first or second passage, passed through said filter tube into said other passage, then discharged into said outlet.

3. A submersible motor, pump and filter structure comprising a filter housing having a fluid inlet and a fluid outlet; a submersible motor-pump assembly having a rotating pump connected thereto and disposed within said housing, said pump member being exposed to circumambient fluid adjacent said outlet for discharging fluid therethrough; a filter member disposed within said filter housing and defining a first fluid passage with said assembly and a second fluid passage with said filter housing, said first and second passages extending between said fluid inlet and said fluid outlet; valve means at both ends of each passage, whereby fluid may be selectively directed from the inlet into either said first or second passage, passed through said filter tube into said other passage, then discharged into said outlet; a first conduit for conducting filtered water, a second conduit for conducting backwash waste, and means for selectively connecting either said first or second conduits to said outlet.

4. A submersible motor, pump and filter structure comprising a filter housing having a fluid inlet and a fluid outlet; a submersible motor-pump assembly having a rotating pump member connected thereto and disposed within said housing, said pump member being exposed to circumambient fluid adjacent said outlet for discharging fluid therethrough; a filter member disposed within said filter housing and defining a first fluid passage with said assembly and a second fluid passage with said filter housing, said first and second passages extending between said fluid inlet and said fluid outlet; means including valve members at both ends of each passage, said valve members being operative between open and closed phases, the valve members in each passage being out of phase with the other and also out of phase with the valve member at the same end in the other passage; a first conduit for conducting filtered water, a second conduit for conducting backwash waste; a valve means operative between first and second positions for selectively connecting either said first or second conduits to said outlet; and means for simultaneously operating said valve members and said valve means to their respective opposite phase and position.

5. A submersible motor, pump and filter structure comprising a filter housing having a fluid inlet and a fluid outlet; a submersible motor-pump assembly having a fluid-tight motor housing mounted within said filter housing and including a rotating pump member exposed to circumambient fluid adjacent said outlet for discharging fluid therethrough; a filter member disposed within said filter housing and defining a first fluid passage with said motor housing and a second fluid passage with said filter housing, said filter member having a sieve portion centrally of two end portions and movable between first and second positions; said filter and motor housings having means providing fixed valve surfaces adjacent said end portions of said filter member; said filter member having means providing valve surfaces at either end portion, said surfaces being disposed to cooperate with said fixed valve surfaces for closing off opposite ends of said first and second passages while simultaneously opening the other ends of said passages; whereby fluid may be selectively directed from the inlet into either said first or second passage, passed through said filter member into said other passage, then discharged into said outlet.

6. A submersible motor, pump and filter structure comprising a filter housing having a fluid inlet and a fluid outlet; a submersible motor-pump assembly having a fluid-tight motor housing mounted within said filter housing and including a rotating pump member exposed to circumambient fluid adjacent said outlet for discharging fluid therethrough; a filter member disposed within said filter housing and defining a first fluid passage with said motor housing and a second fluid passage with said filter housing, said filter member having a sieve portion centrally of two end portions and movable between first and second positions; a plurality of filter elements axially aligned and coaxially mounted about said sieve portion; said filter and motor housings having means providing fixed valve surfaces adjacent said end portions of said filter member; said filter member having means providing valve surfaces at either end portion, said surfaces being disposed to cooperate with said fixed valve surfaces for closing off opposite ends of said first and second passages while simultaneously opening the other ends of said passages; whereby fluid may be selectively directed from the inlet into either said first or second passage, passed through said filter member into said other passage, then discharged into said outlet.

7. A submersible motor, pump and filter structure comprising a filter housing having a fluid inlet and a fluid outlet; a submersible motor-pump assembly having a fluid-tight motor housing coaxially mounted within said filter housing and including a rotating pump member exposed to circumambient fluid adjacent said outlet for discharging fluid therethrough; a filter member disposed within said filter housing and defining a first fluid passage with said motor housing and a second fluid passage with said filter housing, said filter member having a sieve portion centrally of two end portions and movable between first and second positions; said filter and motor housings having means providing fixed valve surfaces adjacent said end portions of said filter member; said filter member having means providing valve surfaces at either end portion, said surfaces being disposed to cooperate with said fixed valve surfaces for closing off opposite ends of said first and second passages while simultaneously opening the other ends of said passages; a first conduit for conducting filtered water, a second conduit for conducting backwash waste, and means for selectively connecting either said first or second conduits to said outlet, whereby depending upon the position of the filter member the fluid may be selectively directed from the inlet into either said first or second passage, passed through said filter member into said other passage, discharged into said outlet and selectively conducted away through either said first or second conduits.

8. A submersible motor, pump and filter structure comprising a filter housing having a fluid inlet and a fluid outlet; a submersible motor-pump assembly having a fluid-tight motor housing mounted within said filter housing and including a rotating pump member exposed to circumambient fluid adjacent said outlet for discharging fluid therethrough; a filter member disposed within said filter housing and defining a first fluid passage with said motor housing and a second fluid passage with said filter housing, said filter member having a sieve portion centrally of two end portions and movable between first and second positions; said filter and motor housings having means providing fixed valve surfaces adjacent said end portions of said filter tube; said filter member having means providing valve surfaces at either end portion, said surfaces being disposed to cooperate with said fixed valve surfaces for closing off opposite ends of said first and second passages while simultaneously opening the other ends of said passages; a first conduit for conducting filtered water, a second conduit for conducting backwash waste, a valve means operative between first and second positions for selectively connecting either said first or second conduits to said outlet; and means operatively connecting said valve means to said filter member; whereby depending upon the position of the filter member the fluid may be selectively directed from the inlet into either said first or second passage, passed through said filter member into said other passage, discharged into said outlet and selectively conducted away through either said first or second conduits.

9. A submersible motor, pump and filter structure comprising a filter housing having a fluid inlet and a fluid outlet; a submersible motor-pump assembly having a fluid-tight motor housing mounted within said filter housing and including a rotating pump member exposed to circumambient fluid adjacent said outlet for discharging fluid therethrough; a filter member disposed within said filter housing and defining a first fluid passage with said motor housing and a second fluid passage with said filter housing, said filter member having a sieve portion centrally of two end portions and movable between first and second positions; a handle member connected to said filter member and accessible from without said housing for moving said filter member between said first and second positions; said filter and motor housings having means providing fixed valve surfaces adjacent said end portions of said filter member; said filter member having means providing valve surfaces at either end portion, said surfaces being disposed to cooperate with said fixed valve surfaces for closing off opposite ends of said first and second passages while simultaneously opening the other ends of said passages; whereby fluid may be selectively directed from the inlet into either said first or second passage, passed through said filter member into said other passage, then discharged into said outlet.

10. A submersible motor, pump and filter structure comprising a filter housing adapted for retaining a quantity of fluid and having a fluid inlet adjacent its top portion, a fluid outlet in its bottom surface, and a removable cover assembly; a removable tubular filter core having a plurality of hollow disk filter elements mounted concentrically thereon in axially superposed relation, said core being supported from the bottom surface of said housing and surmounting said fluid outlet; a submersible motor-pump assembly disposed at least partially within said tubular filter core and having a rotating pump member exposed to circumambient fluid adjacent said outlet for discharging fluid therethrough; a handle member connected to said filter core, extending through said removable cover assembly and being accessible from without said housing for axially moving said filter core; a first conduit for conducting water, a second conduit for conducting water, a valve means operative between first and second positions for selectively connecting either said first or second conduits to said outlet; and means operatively connecting said valve means to said filter core; whereby fluid may enter said housing through said inlet and be expelled through said outlet, said filter core and motor-pump assembly being conveniently nested and arranged in a compact filter housing; and whereby axial reciprocation of said filter core will operate said valve means causing a redirection of fluid flow from one of said conduits to the other.

11. A filter comprising a cylindrical filter tank having an inlet and an outlet, a filter pump for producing a flow of water from the inlet to the outlet, said pump comprising a cylindrical housing which extends axially through the tank and is mounted at one end on one end wall of the tank, a motor enclosed within said housing, a hollow permeable filter element in the tank having a central opening slidably receiving said housing whereby said housing provides a support for the filter element, the other end of the filter tank having an opening through which said element may be removed from and placed in said housing, removable closure means closing said last mentioned opening, said inlet opening to the interior of the tank on the outside of said element, and means communicating the interior of the element with said outlet.

12. A filter assembly comprising a casing having an inlet and an outlet and including means defining a filter tank, a hollow permeable filter element within the tank having passage means opening through the wall of the element to the interior of the element, means on said casing for selectively communicating said casing outlet to the interior of said element through said passage means and said casing inlet to the interior space of the tank on the outside of the element to condition said assembly for filtering operation, or communicating said casing inlet to said interior of the element through said passage means and said casing outlet to said interior space of the tank on the outside of the element to condition said assembly for washing operation, whereby liquid flows from said interior space of the tank to the interior of the filter element to effect filtering of the liquid when the assembly is conditioned for filtering operation and liquid flows from the interior of the filter element to said interior space of the tank when the assembly is conditioned for washing operation, and means for sealing the filter element to the filter tank about said passage means when the assembly is conditioned for filtering operation and washing operation to restrain liquid from flowing between said interior space of the tank and said interior of the element through said passage means.

(References on following page)

References Cited by the Examiner

UNITED STATES PATENTS

| | | | |
|---|---|---|---|
| 171,056 | 12/75 | Sinclaire | 210—416 X |
| 617,133 | 1/99 | Vance | 210—391 X |
| 733,160 | 10/04 | Porter | 210—391 X |
| 1,340,599 | 5/20 | Clarke | 210—411 X |
| 2,335,756 | 11/43 | Haldeman | 210—416 X |
| 2,667,270 | 1/54 | Cady et al. | 210—196 |
| 2,826,307 | 3/58 | Pace | 210—169 |
| 2,844,255 | 7/58 | Cavenah et al. | 210—170 |
| 2,900,979 | 8/59 | Pace | 210—169 |

REUBEN FRIEDMAN, *Primary Examiner.*

HERBERT L. MARTIN, HERMAN BERMAN, CARL F. KRAFT, *Examiners.*